United States Patent
Kato et al.

(10) Patent No.: US 9,415,692 B2
(45) Date of Patent: Aug. 16, 2016

(54) VEHICLE BRAKE HYDRAULIC PRESSURE CONTROL APPARATUS

(71) Applicant: NISSIN KOGYO CO., LTD., Ueda, Nagano (JP)

(72) Inventors: Nobuyoshi Kato, Nagano (JP); Tomoaki Sekiya, Nagano (JP); Keisuke Wakizaka, Nagano (JP)

(73) Assignee: AUTOLIV NISSIN BRAKE SYSTEMS JAPAN CO., LTD., Nagano (JP)

( * ) Notice: Subject to any disclaimer, the term of this patent is extended or adjusted under 35 U.S.C. 154(b) by 0 days.

(21) Appl. No.: 14/307,920

(22) Filed: Jun. 18, 2014

(65) Prior Publication Data

US 2014/0379234 A1    Dec. 25, 2014

(30) Foreign Application Priority Data

Jun. 19, 2013   (JP) .................................. 2013-128858

(51) Int. Cl.
   *B60L 7/18*   (2006.01)
   *B60T 8/32*   (2006.01)
   (Continued)

(52) U.S. Cl.
   CPC ... *B60L 7/18* (2013.01); *B60T 1/10* (2013.01); *B60T 7/042* (2013.01); *B60T 8/1769* (2013.01); *B60T 8/24* (2013.01); *B60T 8/322* (2013.01); *B60T 13/662* (2013.01); *B60T 13/686* (2013.01);
   (Continued)

(58) Field of Classification Search
   USPC ...................................................... 701/68–98
   See application file for complete search history.

(56) References Cited

U.S. PATENT DOCUMENTS

| | | | |
|---|---|---|---|
| 8,157,334 B2 * | 4/2012 | Jeon ...................... | B60T 13/585 303/116.1 |
| 8,366,210 B2 * | 2/2013 | Maki ...................... | B60K 6/445 303/151 |

(Continued)

FOREIGN PATENT DOCUMENTS

| | | |
|---|---|---|
| JP | 04293651 | 10/1992 |
| JP | 2000062590 | 2/2000 |

(Continued)

OTHER PUBLICATIONS

Japanese Office Action for related JP Application 2013-128858 dated Jun. 2, 2015, 8 pages.

(Continued)

*Primary Examiner* — Rami Khatib
*Assistant Examiner* — Timothy Nesley
(74) *Attorney, Agent, or Firm* — Andrew M. Calderon; Roberts Mlotkowski Safran Cole & Calderon, P.C.

(57) ABSTRACT

A vehicle brake hydraulic pressure control apparatus includes a wheel speed acquiring section, a vehicle body deceleration calculator, and a switch section. The wheel speed acquiring section is configured to acquire a wheel speed from a wheel speed sensor. The vehicle body deceleration calculator is configured to calculate a vehicle body deceleration. The switch section is configured to switch control from the regenerative cooperation control to the hydraulic pressure control, based on (i) a wheel deceleration which is determined based on the wheel speed and (ii) the vehicle body deceleration. The vehicle body deceleration calculator is configured to calculate the vehicle body deceleration based on a required deceleration which corresponds to a driver's operation of a braking pedal.

18 Claims, 6 Drawing Sheets

(51) Int. Cl.
*B60T 8/24* (2006.01)
*B60T 1/10* (2006.01)
*B60T 7/04* (2006.01)
*B60T 13/66* (2006.01)
*B60T 13/68* (2006.01)
*B60T 13/74* (2006.01)
*B60T 8/1769* (2006.01)
*B60T 8/40* (2006.01)

(52) U.S. Cl.
CPC ............. *B60T 13/745* (2013.01); *B60T 8/4081* (2013.01); *B60T 2270/604* (2013.01)

(56) References Cited

U.S. PATENT DOCUMENTS

| | | | | |
|---|---|---|---|---|
| 8,608,256 | B2* | 12/2013 | Park | B60T 1/10 303/15 |
| 2003/0173826 | A1* | 9/2003 | Tazoe | B60L 7/26 303/152 |
| 2006/0220453 | A1 | 10/2006 | Saito et al. | |
| 2011/0006593 | A1* | 1/2011 | Sakai | B60T 8/4081 303/6.01 |
| 2013/0234500 | A1* | 9/2013 | Morishita | B60T 1/10 303/3 |
| 2013/0282253 | A1* | 10/2013 | Ono | B60T 8/1706 701/72 |
| 2014/0121915 | A1* | 5/2014 | Kurosaki | B60T 7/122 701/53 |
| 2014/0375115 | A1* | 12/2014 | Ajiro | B60L 3/10 303/152 |
| 2015/0088379 | A1* | 3/2015 | Hirao | B60G 17/015 701/37 |

FOREIGN PATENT DOCUMENTS

| | | |
|---|---|---|
| JP | 2002162225 | 6/2002 |
| JP | 2006333665 | 12/2006 |
| JP | 2012214110 | 11/2012 |
| JP | 2013086626 A | 5/2013 |

OTHER PUBLICATIONS

European Search Report dated Nov. 6, 2015 in related EP Application No. 14172933.5-1756, 8 pages.

* cited by examiner

VEHICLE BRAKE HYDRAULIC PRESSURE CONTROL APPARATUS

CROSS REFERENCE TO RELATED APPLICATION

This application is based on and claims priority under 35 U.S.C. §119 to Japanese Patent Application No. 2013-128858 (filed on Jun. 19, 2013), the entire contents of which are incorporated herein by reference.

BACKGROUND

1. Field

Exemplary embodiments of the invention relate to a vehicle brake hydraulic pressure control apparatus.

2. Related Art

For example, JP H04-293651 A describes a vehicle brake hydraulic pressure control apparatus to be mounted in a four-wheel drive vehicle. To prevent such a phenomenon that four wheels of a vehicle are simultaneously locked, that is, a so-called cascade locking, this apparatus determines a lock-up tendency by (i) calculating a vehicle body velocity based on an acceleration which is acquired by a longitudinal acceleration sensor and (ii) comparing the vehicle body velocity with wheel speeds to obtain a slip rate.

SUMMARY

In hybrid vehicles, when braking is started, firstly, a regenerative cooperation control (subsidiarily controlling a brake hydraulic pressure in accordance with regenerative braking) for regenerative braking is executed, and then control is switched from the regenerative cooperation control to hydraulic pressure control when the slip rate becomes equal to or larger than a predetermined value. There is a case where the slip rate which is used as an index for the switching from the regenerative cooperation control to the hydraulic pressure control is calculated based on the vehicle body velocity which is obtained by the longitudinal acceleration sensor. In this case, if the longitudinal acceleration sensor fails due to abnormality, it may be difficult to switch from the regenerative cooperation control to the hydraulic pressure control.

One of exemplary embodiments of the invention provides a vehicle brake hydraulic pressure control apparatus that can well switch control from the regenerative cooperation control to the hydraulic pressure control independently from an output of a longitudinal acceleration sensor.

(1) According to one exemplary embodiment, a vehicle brake hydraulic pressure control apparatus is to be mounted on a four-wheel drive vehicle. The vehicle brake hydraulic pressure control apparatus executes (i) a regenerative cooperation control in which a brake hydraulic pressure is controlled in accordance with regenerative braking and (ii) a hydraulic pressure control which is performed when regenerative braking is not in operation. The vehicle brake hydraulic pressure control apparatus includes a wheel speed acquiring section, a vehicle body deceleration calculator, and a switch section. The wheel speed acquiring section is configured to acquire a wheel speed from a wheel speed sensor. The vehicle body deceleration calculator is configured to calculate a vehicle body deceleration. The switch section is configured to switch control from the regenerative cooperation control to the hydraulic pressure control, based on (i) a wheel deceleration which is determined based on the wheel speed and (ii) the vehicle body deceleration. The vehicle body deceleration calculator is configured to calculate the vehicle body deceleration based on a required deceleration which corresponds to a driver's operation of a braking pedal.

With this configuration, the vehicle body deceleration can be calculated independently from the output of the longitudinal acceleration sensor. Therefore, the regenerative cooperation control can be well switched to the hydraulic pressure control, independently from the output of the longitudinal acceleration sensor.

(2) The vehicle brake hydraulic pressure control apparatus of (1) may further include a lateral acceleration acquiring section. The lateral acceleration acquiring section is configured to acquire an acceleration of the vehicle in a lateral direction. The vehicle body deceleration calculator may be configured to calculate the vehicle body deceleration based on the required deceleration and the acceleration in the lateral direction.

With this configuration, the vehicle body deceleration is calculated by taking into consideration the braking force based on the orientation of wheels while the vehicle is turning. Therefore, the vehicle body deceleration can be calculated with good accuracy.

(3) The vehicle brake hydraulic pressure control apparatus of any one of (1) to (2) may further include an inclination acquiring section. The inclination acquiring section is configured to acquire an inclination of a road surface on which the vehicle travels. The vehicle body deceleration calculator may be configured to calculate the vehicle body deceleration based on the inclination of the road surface.

With this configuration, the vehicle body deceleration is calculated by taking into consideration the inclination of the road surface. Therefore, the vehicle body deceleration can be calculated with good accuracy.

(4) In the vehicle brake hydraulic pressure control apparatus of (3), the inclination acquiring section may be configured to estimate the inclination of the road surface based on a wheel deceleration immediately before the vehicle starts braking.

With this configuration, the inclination of the road surface gradient can be estimated without using the longitudinal acceleration sensor.

(5) The vehicle brake hydraulic pressure control apparatus of any one of (1) to (4) may further include an operation amount acquiring section and an electric motor control section. The operation amount acquiring section is configured to acquire a brake operation amount. The electric motor control section is configured to control a brake hydraulic pressure by controlling an electric motor provided in a by-wire type electric brake system based on the brake operation amount. The required deceleration may be calculated based on an output from the operation amount acquiring section.

With this configuration, in the by-wire type electric brake system, the required deceleration and the vehicle body deceleration can be well calculated based on the brake operation amount acquired by the operation amount acquiring section.

(6) In the vehicle brake hydraulic pressure control apparatus of (5), the operation amount acquiring section may be configured to acquire, from a stroke sensor that detects a stroke of the braking pedal, the stroke as the brake operation amount.

With this configuration, the brake operation amount is acquired directly by the stroke sensor. As compared with, for example, a configuration where a brake hydraulic pressure is acquired as an indirect brake operation amount, the required deceleration and the vehicle body deceleration can be calculated with good accuracy.

(7) According to another embodiment of the invention, a vehicle brake hydraulic pressure control apparatus is to be mounted on a four-wheel drive vehicle. The vehicle brake hydraulic pressure control apparatus executes (i) a regenerative cooperation control in which a brake hydraulic pressure is controlled in accordance with regenerative braking and (ii) a hydraulic pressure control which is performed when regenerative braking is not in operation. The vehicle brake hydraulic pressure control apparatus includes a wheel speed acquiring section, a vehicle body deceleration calculator, and a switch section. The wheel speed acquiring section is configured to acquire a wheel speed from a wheel speed sensor. The vehicle body deceleration calculator is configured to calculate a vehicle body deceleration. The switch section is configured to switch control from the regenerative cooperation control to the hydraulic pressure control, based on (i) a vehicle body speed obtained from the vehicle body deceleration and (ii) the wheel speed. The vehicle body deceleration calculator is configured to calculate the vehicle body deceleration based on a required deceleration which corresponds to a driver's operation of a braking pedal.

With this configuration, the vehicle body deceleration (a vehicle body deceleration to calculate a vehicle body velocity) can be calculated independently from the output of the longitudinal acceleration sensor. Therefore, the regenerative cooperation control can be well switched to the hydraulic pressure control independently from the output of the longitudinal acceleration sensor.

According to exemplary embodiments of the invention, the regenerative cooperation control can be well switched to the hydraulic pressure control independently from the output of the longitudinal acceleration sensor.

DETAILED DESCRIPTION

Next, exemplary embodiments of the invention will be described in detail with reference to the accompanying drawings.

Figure 1:
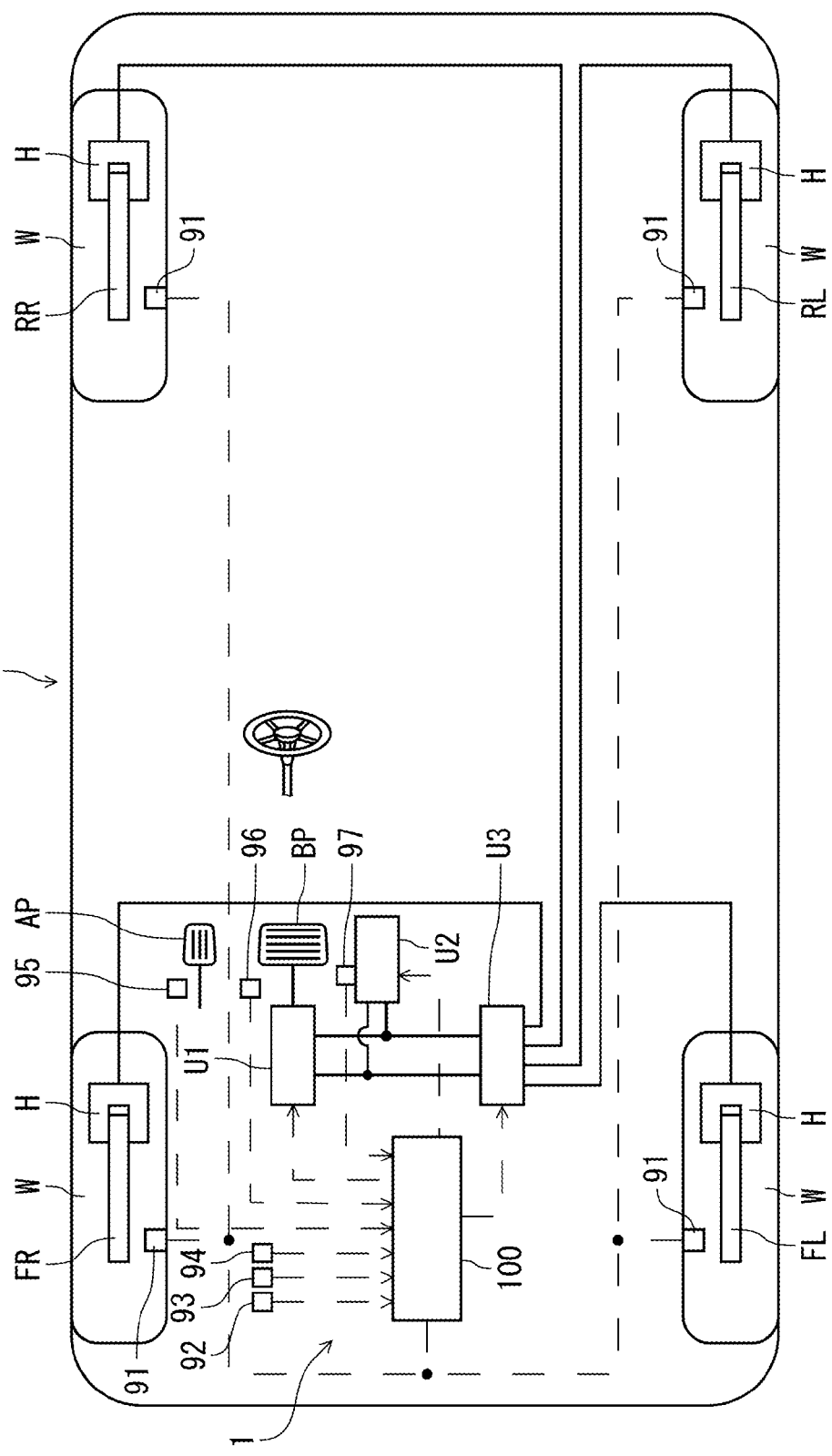
FIG. 1 is a block diagram of a vehicle that includes a controller which is an example of a vehicle brake hydraulic pressure control apparatus according to one exemplary embodiment of the invention.

FIG. 1 shows a brake system 1 to which a controller 100 that is an example of a vehicle brake hydraulic pressure control apparatus is applied. The brake system 1 is mounted in a four-wheel drive hybrid vehicle. The brake system 1 includes both of a by-wire type electric brake system for normal time and a hydraulic brake system for fail-safe. The by-wire type electric brake system transmits electric signals to apply brakes. Also, the hydraulic brake system transmits a hydraulic pressure generated by depression effort exerted on a braking pedal BP as it is to apply brakes.

The brake system 1 includes an input unit U1, a motor cylinder unit U2, and a hydraulic pressure control unit U3. When a braking pedal BP is operated by a driver, the input unit U1 inputs the operation of the braking pedal BP. The motor cylinder unit U2 generates a brake hydraulic pressure according to an operation amount of the braking pedal BP (hereinafter, which may be referred to as a "brake operation amount") and/or a necessary control. The hydraulic pressure control unit U3 executes a brake hydraulic pressure control for supporting the stabilization of vehicle behavior. Each of the input unit U1, the motor cylinder unit U2, and the hydraulic pressure control unit U3 includes a first system for a right front wheel brake FR and a left rear wheel brake RL and a second system for a left front wheel brake FL and a right rear wheel brake RR. With regard to the respective systems, the input unit U1, the motor cylinder unit U2, and the hydraulic pressure control unit U3 are connected independently via hydraulic pressure lines formed by tubular members such as hoses and tubes, for example. Also, the input unit U1 and the motor cylinder unit U2 are electrically connected to each other via a wiring harness (not shown).

To control the behavior of a vehicle CR by the electric brake system and the hydraulic pressure control unit U3, the brake system 1 includes in appropriate positions in the vehicle CR wheel speed sensors 91, a steering angle sensor 92, a lateral acceleration sensor 93, a longitudinal acceleration sensor 94, an accelerator pedal stroke sensor 95 that detects a stroke of an accelerator pedal AP, a braking pedal stroke sensor 96 that detects a stroke of the braking pedal BP, and a motor rotation angle sensor 97. Output values of these sensors are output to the controller 100. The motor rotation angle sensor 97 is a sensor that detects a rotation angle of an electric motor 42 (see FIG. 2) which drives the motor cylinder unit U2.

The controller 100 includes, for example, a CPU, a RAM, a ROM, and an input/output circuit. The controller 100 executes various arithmetic operations based on the output values from the above described sensors and/or programs and data which are stored in the ROM, so as to control the input unit U1, the motor cylinder unit U2 and the hydraulic pressure control unit U3. With this configuration, the controller 100 can control brake hydraulic pressures applied to respective wheel cylinders H of the wheel brakes FR, RL, FL, RR to impart appropriate braking forces to wheels W.

Figure 2:
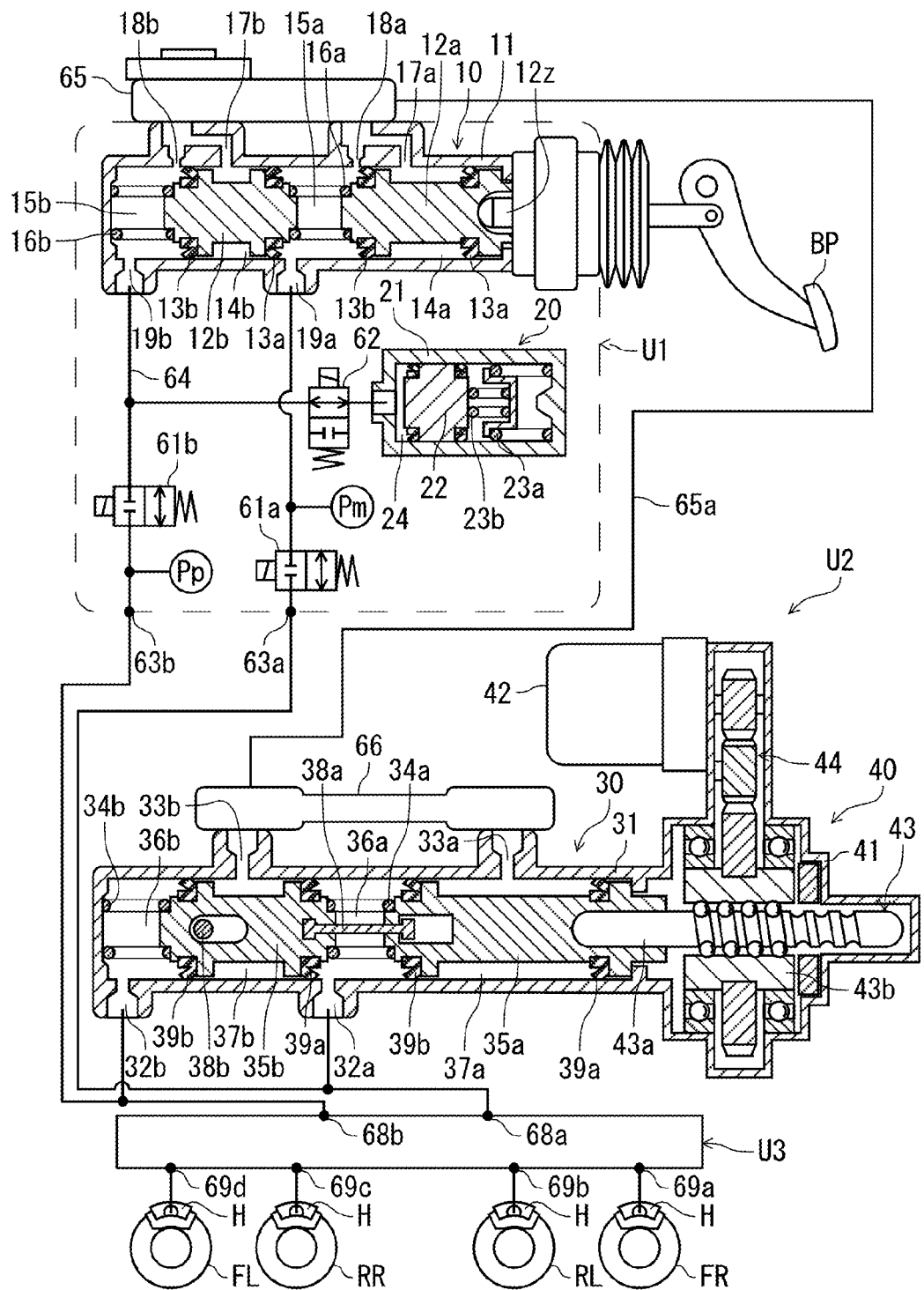
FIG. 2 is a block diagram showing brake hydraulic pressure circuits of an input unit and a motor cylinder unit.

As shown in FIG. 2, a connection port 63a of the first system of the input unit U1 is connected to an output port 32a of the motor cylinder unit U2 and an input port 68a of the hydraulic pressure control unit U3 via piping. Similarly, a connection port 63b of the second system of the input unit U1 is connected to an output port 32b of the motor cylinder unit U2 and an input port 68b of the hydraulic pressure control unit U3 via piping.

Four output ports 69a to 69d are provided in the hydraulic pressure control unit U3 The wheel cylinders H of the wheel brakes FR, RL, RR, FL are connected to these output ports 69a to 69d, respectively.

[Input Unit U1]

The input unit U1 has a tandem-type master cylinder 10 and a first reservoir 65. The tandem-type master cylinder 10 can generate a hydraulic pressure in response to driver's operations of the braking pedal BP. The first reservoir 65 is placed along the master cylinder 10. A first piston 12a and a second piston 12b are slidably provided in a cylinder tube 11 of the master cylinder 10 so as to be spaced a predetermined distance apart from each other in an axial direction of the cylinder tube 11. The first piston 12a is disposed near the braking pedal BP and is connected to the braking pedal BP via a push rod 12z. The second piston 12b is disposed farther away from the braking pedal BP than the first piston 12a.

A pair of piston packings 13a, 13b are mounted on an outer circumferential surface of each of the first piston 12a and the second piston 12b, so as to be spaced apart from each other in the axial direction. The first piston 12a and the second piston 12b have smaller diameters between the piston packings 13a, 13b to form respective back chambers 14a, 14b therein. The back chambers 14a, 14b are connected to the first reservoir 65 via respectively supply ports 17a, 17b.

A first pressure chamber 15a is defined between the first piston 12a and the second piston 12b. The first pressure chamber 15a is connected to the first reservoir 65 via a relief port 18a. Similarly, a second pressure chamber 15b is defined between the second piston 12b and a longitudinal end portion of the cylinder tube 11. The second pressure chamber 15b is connected to the first reservoir 65 via a relief port 18b. When the driver depresses the braking pedal BP, a brake hydraulic pressure which corresponds to the effort exerted on the braking pedal BP by the driver is generated in the first pressure chamber 15a and the second pressure chamber 15b.

A spring 16a is provided between the first piston 12a and the second piston 12b. A spring 16b is provided between the second piston 12b and the longitudinal end portion of the cylinder tube 11. With this configuration, the first pressure chamber 15a and the second pressure chamber 15b restore their capacities appropriately when the driver stops operating the braking pedal BP.

Also, output ports 19a, 19b are formed in the cylinder tube 11 so as to correspond to the pressure chambers 15a, 15b, respectively. These output ports 19a, 19b communicate with the pressure chambers 15a, 15b, respectively. Then, the output ports 19a, 19b are connected to the connection ports 63a, 63b of the input unit U1, respectively, via piping.

A normally open solenoid valve 61a is provided in the piping which connects the output port 19a of the master cylinder 10 to the connection port 63a of the input unit U1. Also, a normally open solenoid valve 61b is provided in the piping which connects the output port 19b of the master cylinder 10 to the connection port 63b of the input unit U1.

A stroke simulator 20 is connected via a normally closed solenoid valve 62 to piping (a branch hydraulic pressure line 64) that connects the output port 19b of the master cylinder 10 to the normally open solenoid valve 61b. FIG. 2 shows that the normally open solenoid valves 61a, 61b are energized and in a normal operating state (closed state) and that the normally closed solenoid valve 62 is energized and in a normal operating state (open state).

The stroke simulator 20 is a device that generates a braking stroke and a reaction force during by-wire control, so as to cause the driver to feel as if a braking force is generated by driver's effort exerted on the braking pedal BP. A piston 22 is provided in a cylinder 21. A hydraulic pressure chamber 24 is formed on one side of the piston 22. The hydraulic pressure chamber 24 communicates with the branch hydraulic pressure line 64 via the normally closed solenoid valve 62. The hydraulic pressure chamber 24 can absorb a brake fluid which is introduced from the second pressure chamber 15b of the master cylinder 10.

A first return spring 23a having a large spring constant and a second return spring 23b having a small spring constant are provided in series between the piston 22 and a longitudinal end portion of the cylinder 21. With this configuration, a rising gradient of a pedal reaction force is set to be low in an initial stage of depression of the braking pedal BP, and is set to be high in a later stage of depression of the braking pedal BP. This makes the pedal feel of the braking pedal BP equivalent to that provided by a master cylinder.

A first hydraulic pressure sensor Pm is provided on the hydraulic pressure line which connects the output port 19a of the master cylinder 10 to the normally open solenoid valve 61a. A second hydraulic pressure sensor Pp is provided on the hydraulic pressure line which connects the normally open solenoid valve 61b to the connection port 63b. The first hydraulic pressure sensor Pm is a sensor that measures a hydraulic pressure on a master cylinder 10 side of the normally open solenoid valve 61a which is closed when it is normally operated. The second hydraulic pressure sensor Pp is a sensor that measures a hydraulic pressure one a connection port 63b side (a hydraulic pressure control unit U3 side) of the normally open solenoid valve 61b which is closed when it is normally operated. Output values from these sensors are output to the controller 100.

[Motor Cylinder Unit U2]

The motor cylinder unit U2 has an actuator mechanism 40 that includes the electric motor 42 and a cylinder mechanism 30 which is actuated by the actuator mechanism 40.

The actuator mechanism 40 has an actuator housing 41. The actuator housing 41 houses a ball screw mechanism 43 and a deceleration gear train 44. The ball screw mechanism 43 includes a threaded shaft 43a and a nut 43b. The deceleration gear train 44 transmits a rotational motion of the electric motor 42 to the nut 43b. The threaded shaft 43a is connected to a first slave piston 35a which will be described later.

The cylinder mechanism 30 has a cylinder main body 31 and a second reservoir 66 which is placed along the cylinder main body 31. The second reservoir 66 is connected to the first reservoir 65 via piping 65a. The first slave piston 35a and a second slave piston 35b are slidably provided in the cylinder main body 31 so as to be spaced a predetermined distance apart from each other in an axial direction of the cylinder main body 31. The first slave piston 35a is disposed near the ball screw mechanism 43. The first slave piston 35a is brought into abutment with one end portion of the threaded shaft 43a so that the first slave piston 35a and the threaded shaft 43a are displaced together along a longitudinal direction of the cylinder main body 31. Also, the second slave piston 35b is disposed so as to be spaced farther away from the ball screw mechanism 43 than the first slave piston 35a.

A pair of slave piston packings 39a, 39b are mounted on an outer circumferential surface of each of the first slave piston 35a and the second slave piston 35b, so as to be spaced apart from each other in the axial direction. The first slave piston 35a and the second slave piston 35b have smaller diameters between the slave piston packings 39a, 39b, to thereby form a first back chamber 37a and a second back chamber 37b. The first back chamber 37a and the second back chamber 37b are connected to the second reservoir 66 via reservoir ports 33a, 33b, respectively.

A first hydraulic pressure chamber 36a is defined between the first slave piston 35a and the second slave piston 35b. A second hydraulic pressure chamber 36b is defined between the second slave piston 35b and the longitudinal end portion of the cylinder main body 31. Also, output ports 32a, 32b are formed in the cylinder main body 31 so as to correspond to the first hydraulic pressure chamber 36a and the second hydraulic pressure chamber 36b, respectively. The output ports 32a, 32b communicate with the first hydraulic pressure chamber 36a and the second hydraulic pressure chamber 36b, respectively. These output ports 32a, 32b connect to the connection ports 63a, 63b of the input unit U1 and the input ports 68a, 68b of the hydraulic pressure control unit U3, respectively. When the threaded shaft 43a moves towards the first slave piston 35a as a result of the electric motor 42 being actuated, a brake hydraulic pressure is generated in the first hydraulic pressure chamber 36a and the second hydraulic pressure chamber 36b, and this brake hydraulic pressure is supplied to the hydraulic pressure control unit U3 through the output ports 32a, 32b.

A spring 34a is provided between the first slave piston 35a and the second slave piston 35b. A spring 34b is provided between the second slave piston 35b and the longitudinal end portion of the cylinder main body 31. With this configuration, the first hydraulic pressure chamber 36a and the second hydraulic pressure chamber 36b restore their capacities appropriately when the threaded shaft 43a moves in an opposite direction to the first slave piston 35a as a result of the electric motor 42 being actuated.

A restriction link 38a is provided between the first slave piston 35a and the second slave piston 35b so as to restrict a maximum stroke (a maximum displaced distance) and a minimum stroke (a minimum displaced distance) for each of the first slave piston 35a and the second slave piston 35b. A stopper pin 38b is provided in the second slave piston 35b to restrict a sliding range of the second slave piston 35b to thereby prevent that the second slave piston 35b excessively returns towards the first slave piston 35a.

[Hydraulic Pressure Control Unit U3]

Figure 3:
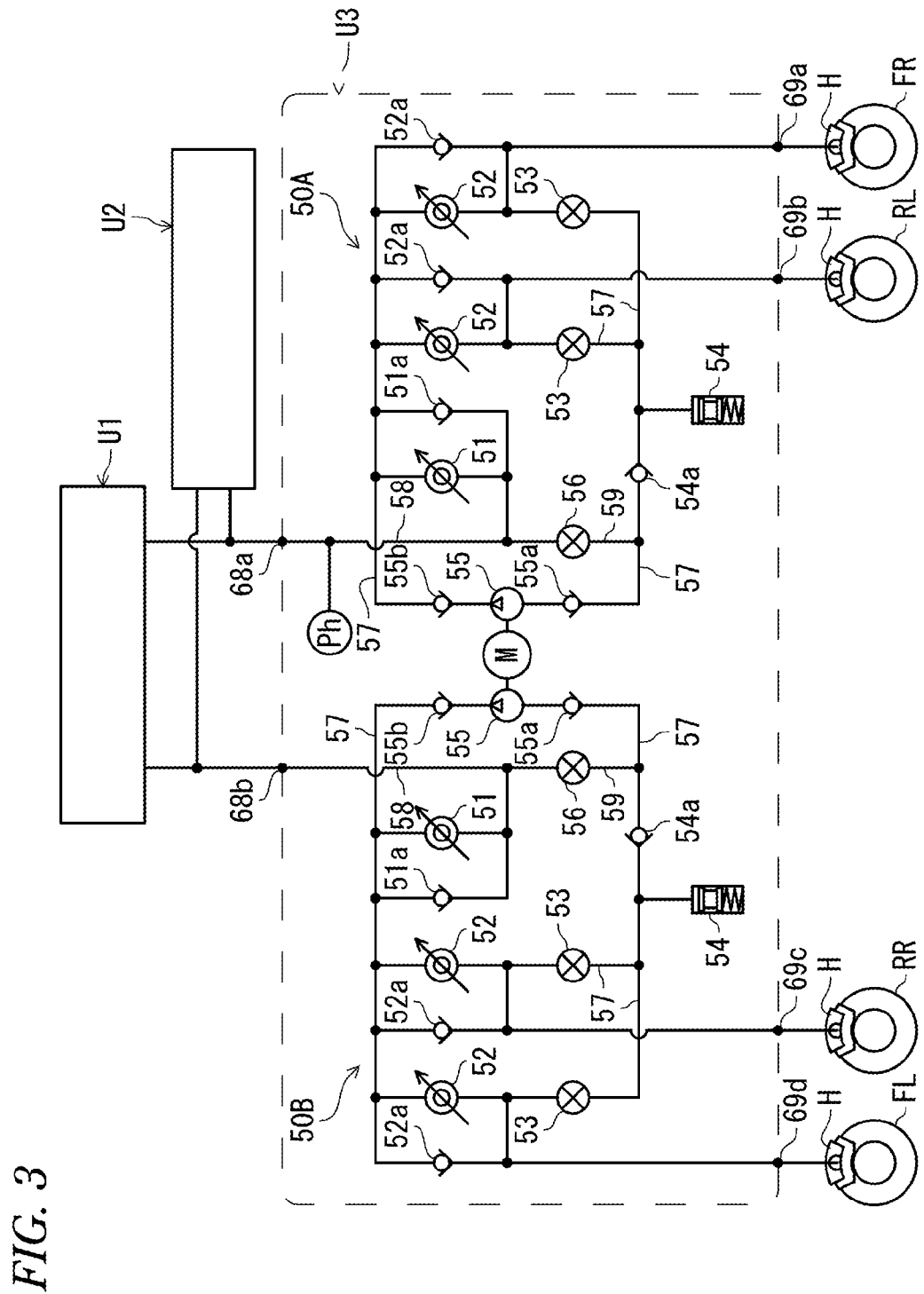
FIG. 3 is a block diagram showing a brake hydraulic pressure circuit of a hydraulic pressure control unit.

As shown in FIG. 3, the hydraulic pressure control unit U3 includes parts which are already known. The hydraulic pressure control unit U3 has a first hydraulic pressure system 50A for the wheel brakes FR, RL and a second hydraulic pressure system 50B for the wheel brakes FL, RR. Since the configurations of the first hydraulic pressure system 50A and the second hydraulic pressure system 50B are the same, the configuration of the first hydraulic pressure system 50A will be described below, and description on the configuration of the second hydraulic pressure system 50B will be omitted.

In the first hydraulic pressure system 50A, a pressure regulator 51 is provided on a hydraulic pressure line that connects the input port 68a to the output ports 69a, 69b. This pressure regulator 51 is a normally open proportional solenoid valve that can adjust a difference in hydraulic pressure between an upstream side and a downstream side thereof. A check valve 51a is provided in parallel to the pressure regulator 51. This check valve 51a only permits brake fluid to flow towards the output ports 69a, 69b.

A hydraulic pressure line which lies closer to the wheel brakes RL, FR than the pressure regulator 51 branches into hydraulic pressure lines in an intermediate portion thereof, and the branched hydraulic pressure lines connect to the output port 69a and the output port 69b, respectively. Inlet valves 52 which are normally open proportional solenoid valves are respectively provided on the branch hydraulic pressure lines corresponding to the output ports 69a, 69b. Check valves 52a are respectively provided in parallel to the inlet valves 52. The check valves 52a only permit brake fluid to flow towards the pressure regulator 51.

A return hydraulic pressure line 57 is provided to branch off from a hydraulic pressure line between the output port 69a and the inlet valve 52 corresponding to the outlet port 69a. Also, another return hydraulic pressure line 57 is provided to branch off from a hydraulic pressure line between the output port 69b and the inlet valve 52 corresponding to the outlet portion 69b. The return hydraulic pressure lines 57 connect to a portion between the pressure regulator 51 and the inlet valves 52 via output valves 53 which are normally closed solenoid valves.

A reservoir 54 that absorbs temporarily an excess brake fluid, a check valve 54a, a check valve 55a, a pump 55 and a check valve 55b are provided on the return hydraulic pressure line 57 in this order from the outlet valve 53 side. Each of the check valves 54a, 55a, 55b is disposed so as to only permit brake fluid to flow towards between the pressure regulator 51 and the inlet valves 52. The pump 55 is driven by a motor M. The pump 55 generates a pressure towards between the pressure regulator 51 and the inlet valves 52.

An introduction hydraulic pressure line 58 that connects the input port 68a to the pressure regulator 51 and a portion on the return hydraulic pressure line 57 between the check valve 54a and the check valve 55a are connected to each other by a suction hydraulic pressure line 59 via a suction valve 56 that is a normally closed solenoid valve.

In the introduction hydraulic pressure line 58, a third hydraulic pressure sensor Ph is provided only on the first hydraulic pressure system 50A. An output value of the third hydraulic pressure sensor Ph is output to the controller 100.

In the hydraulic pressure control unit U3, which is configured as described above, normally, the respective solenoid valves are not energized, and a brake fluid that is introduced from the input port 68a passes through the pressure regulator 51 and the inlet valves 52, is then output to the output ports 69a, 69b, and is supplied to the wheel cylinders H as it is. When an excessive brake hydraulic pressure at the wheel cylinder H is reduced to perform an anti-locking brake control, the corresponding inlet valve 52 is closed and the corresponding output valve 53 is opened, so that the brake fluid is caused to flow to the reservoir 54 through the return hydraulic pressure line 57. Thereby, the brake fluid in the wheel cylinder H can be removed therefrom. When the hydraulic pressures at the wheel cylinders H are to be increased without the driver's operation of the braking pedal BP, the suction valve 56 is opened, and then, the motor M is driven to drive the pump 55. Thereby, the brake fluid can be positively supplied to the wheel cylinders H by means of the pressurization by the pump 55. Furthermore, when it is required to adjust the degrees of the pressures imparted to the wheel cylinders H, a required adjustment can be executed by energizing the pressure regulator 51 appropriately.

Figure 4:
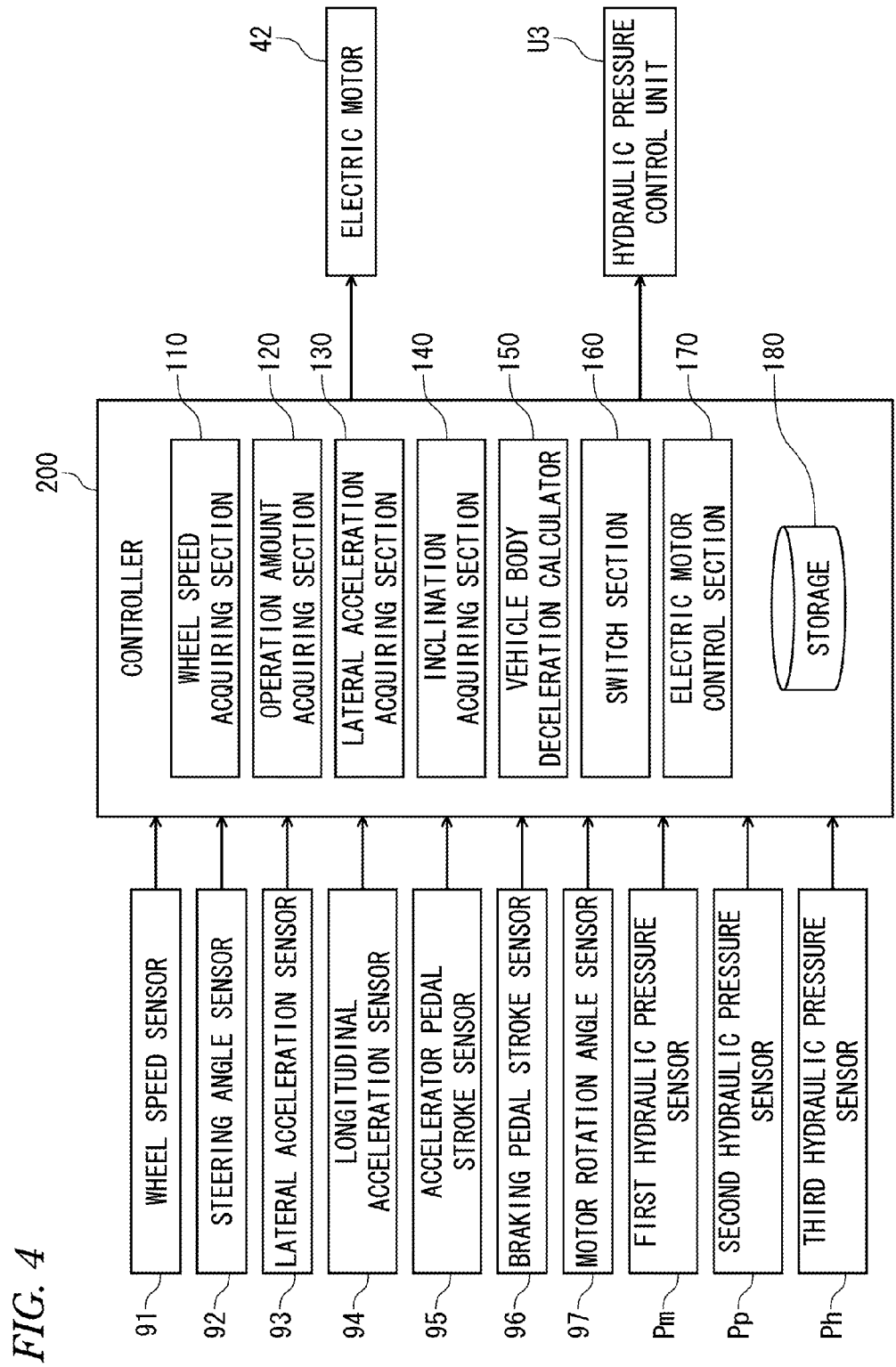
FIG. 4 is a block diagram showing the configuration of a controller.

Next, the controller 100 will be described in detail. As shown in FIG. 4, the controller 100 executes a by-wire type hydraulic pressure control, a regenerative cooperation control, and an ABS (an anti-locking brake system) control based on signals input from the sensors. In the regenerative cooperation control, a braking force is generated mainly through regenerative braking which makes use of a drive electric motor for driving the vehicle, and the electric motor 42 and the hydraulic pressure control unit U3 are controlled so as to make up for a shortage of braking force by the hydraulic brakes.

If it is determined based on a signal from the braking pedal stroke sensor 96 that the driver depresses the braking pedal BP, the controller 100 firstly executes the regenerative cooperation control. When a predetermined condition is met, the controller 100 switches control from the regenerative cooperation control to the hydraulic pressure control that executes braking only by the brake hydraulic pressures. To switch control from the regenerative cooperation control to the hydraulic pressure control without using a signal from the longitudinal acceleration sensor 94, the controller 100 according to this exemplary embodiment is configured as follows.

The controller 100 includes a wheel speed acquiring section 110, an operation amount acquiring section 120, a lateral acceleration acquiring section 130, a inclination acquiring section 140, a vehicle body deceleration calculator 150, a switch section 160, an electric motor control section 170, and a storage 180.

The wheel speed acquiring section 110 has a function to acquire wheel speeds Vw from the wheel speed sensors 91 and outputs the acquired wheel speeds Vw to the switch section 160 and the storage 180. The storage 180 stores the wheel speeds Vw so that the wheel speeds Vw remain there as a history. The history is reset at an appropriate timing (for example, when the vehicle stops).

The operation amount acquiring section 120 has a function to acquire a stroke of the braking pedal BP from the braking pedal stroke sensor 96 as an example of a brake operation amount. The operation amount acquiring section 120 outputs the acquired stroke to the vehicle body deceleration calculator 150 and the electric motor control section 170.

The lateral acceleration acquiring section 130 has a function to acquire an acceleration in a lateral direction of the vehicle (hereinafter, which may be referred to as a "lateral acceleration") from the lateral acceleration sensor 93. The lateral acceleration acquiring section 130 outputs the acquired lateral acceleration to the vehicle body deceleration calculator 150.

The inclination acquiring section 140 has a function to acquire an inclination of a road surface on which the vehicle travels. More specifically, the inclination acquiring section 140 determines, based on a signal from the braking pedal stroke sensor 96, as to whether or not the vehicle has started braking. If the inclination acquiring section 140 determines that the vehicle starts braking, the inclination acquiring section 140 acquires the wheel speeds Vw at two points in time immediately before the vehicle starts braking (for example, previous values when the braking is started and values before the previous values) from the storage 180. Then, the inclination acquiring section 140 calculates a wheel speed deceleration −Ah based on the acquired wheel speeds Vw, estimates the calculated wheel deceleration −Ah as an inclination of the road surface, and outputs the inclination of the road surface to the vehicle body deceleration calculator 150.

In this exemplary embodiment, deceleration is treated as a negative value. It is assumed that Ah which is obtained by removing the negative sign from −Ah is a positive value. Also, the wheel deceleration calculated as the inclination of the road surface is expressed as −Ah as described above, and the other normal wheel decelerations are expressed as −Aw.

The vehicle body deceleration calculator 150 calculates a vehicle body deceleration based on (i) required deceleration which is based on the driver's operation of the braking pedal and (ii) the lateral acceleration and corrects the calculated vehicle body deceleration based on the inclination of the road surface (wheel deceleration −Ah). More specifically, the vehicle body deceleration calculator 150 calculates a required brake hydraulic pressure based on the stroke which is output from the operation amount acquiring section 120, as a value corresponding to the required deceleration. Then, the vehicle body deceleration calculator 150 calculates a temporary vehicle body deceleration −At based on the required brake hydraulic pressure calculated, the lateral acceleration, and a map shown in FIG. 5.

The map indicates a relationship among the required brake hydraulic pressure, the lateral acceleration, and the temporary vehicle body deceleration −At. The map is prepared so that an absolute value of a temporary vehicle body deceleration −At increases with an increase of the required brake hydraulic pressure and an increase of the lateral acceleration. In the map, the absolute values of −A1, −A2 and −A3 have such a relationship that A1<A2<A3. That is, in reality where the actual signs given thereto are taken into consideration, the temporary vehicle body decelerations have such a relationship that −A1>−A2>−A3.

When the vehicle body deceleration calculator 150 obtains (has calculated) a temporary vehicle body deceleration −At by using the map, the vehicle body deceleration calculator 150 calculates a vehicle body deceleration −Ac by offsetting the calculated temporary vehicle body deceleration −At by the inclination of the road surface (wheel deceleration −Ah). That is, the vehicle body deceleration calculator 150 calculates the vehicle body deceleration −Ac by the following equation (1).

$$-Ac=-At-Ah \quad (1)$$

When the vehicle body deceleration calculator 150 obtains (has calculated) vehicle body deceleration −Ac, the vehicle body deceleration calculator 150 outputs the calculated vehicle body deceleration −Ac to the switch section 160. The vehicle body deceleration calculator 150 is configured to start to calculate the vehicle body deceleration −At from the point in time when the driver depresses the braking pedal BP.

The switch section 160 has a function to switch control from the regenerative cooperation control to the hydraulic pressure control, based on the vehicle body deceleration −Ac output from the vehicle body deceleration calculator 150 and the wheel speeds Vw output from the wheel speed acquiring section 110. More specifically, the switch section 160 calculates a wheel deceleration −Aw based on the wheel speeds Vw output from the wheel speed acquiring section 110 and determines as to whether or not an absolute value of a difference between the vehicle body deceleration −Ac and the wheel deceleration −Aw is equal to or larger than a predetermined threshold. When it is determined that the absolute value of the difference between the vehicle body deceleration −Ac and the wheel deceleration −Aw is equal to or larger than the predetermined threshold, the switch section 160 outputs to a control unit (not shown) a termination signal for terminating the regenerative cooperation control, to thereby terminate for the control unit to execute the regenerative braking control using the drive electric motor, and switches the control of the hydraulic pressure control unit U3 and the electric motor 42 from the regenerative cooperation control to the normal hydraulic pressure control.

The electric motor control section 170 has a function to control the brake hydraulic pressure by controlling the electric motor 42 based on the stroke output from the operation amount acquiring section 120. More specifically, in the regenerative cooperation control, the electric motor 42 is controlled in consideration of the stroke and a braking force produced by regenerative braking, whereas in the hydraulic pressure control, the electric motor 42 is controlled mainly based on the stroke without taking the braking force produced by the regenerative braking into consideration.

The map, the wheel speeds Vw, and the threshold values are stored in the storage 180.

Next, referring to FIGS. 6A to 6E, the operation of the controller 100 will be described. In FIGS. 6C and 6E, a regeneration flag indicates an execution state of the regenerative braking, and a hydraulic pressure flag indicates a state of the hydraulic pressure control. Specifically, where the regeneration flag is 1, the regenerative braking is executed, whereas where the regeneration flag is 0, the regenerative braking is not executed. Also, where the hydraulic pressure flag is 0, the hydraulic pressure control is not executed. Where the hydraulic pressure flag is 1, the subsidiary hydraulic pressure control is executed in the regenerative cooperation control. Where the hydraulic pressure flag is 2, the normal hydraulic pressure control is executed in which the regenerative braking is not taken into consideration.

Figure 6A:
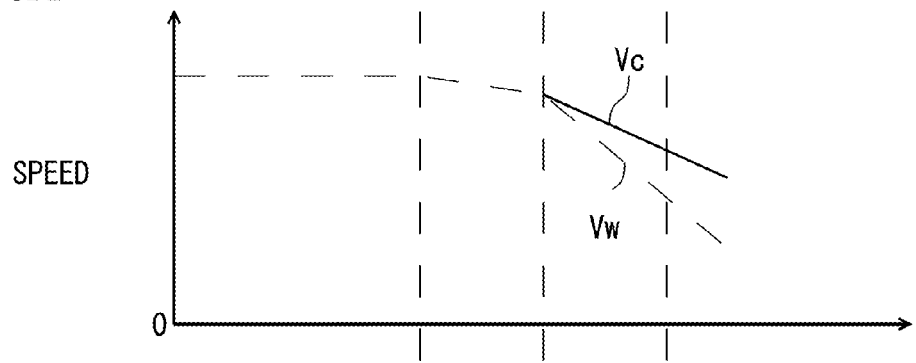
FIGS. 6A to 6E are time charts that show operation of the controller.
Figure 6B:
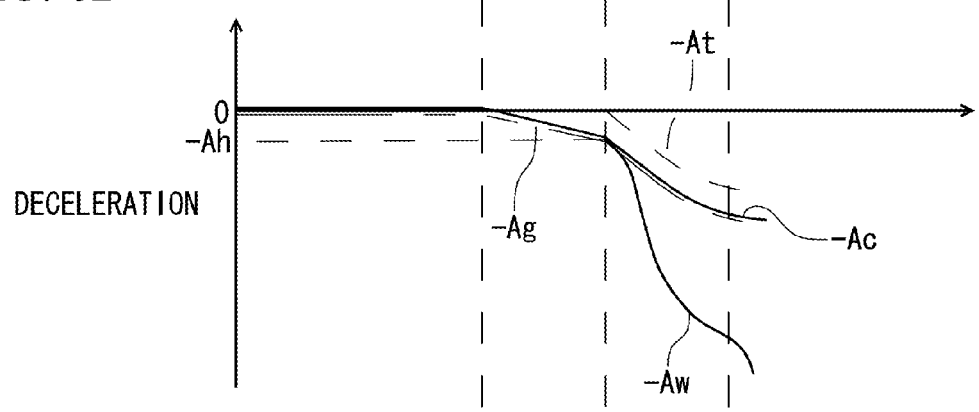
Figure 6C:
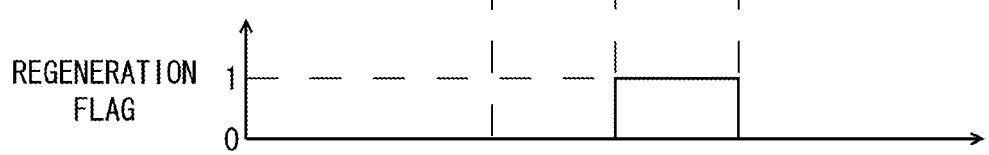
Figure 6D:
Figure 6E:
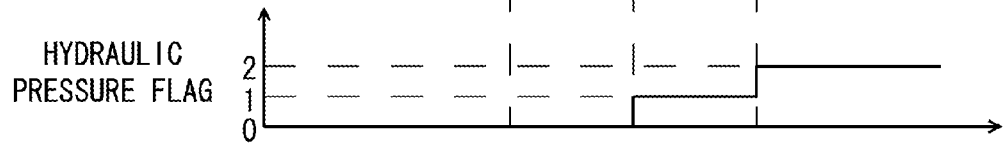

As shown in FIGS. 6A and 6B, when the driver releases the accelerator pedal AP (at time t1) in a state where the vehicle travels on an upward slope at a constant vehicle speed, the wheel speeds Vw and the wheel decelerations −Aw decrease naturally due to the effect of the upslope (the absolute values of the wheel decelerations −Aw increase). Thereafter, when the driver depresses the braking pedal BP (at time t2) as shown in FIG. 6D, the regenerative braking is executed as shown in FIG. 6C and the subsidiary hydraulic pressure control is also executed in the regenerative cooperation control as shown in FIGS. 6E.

Figure 5:
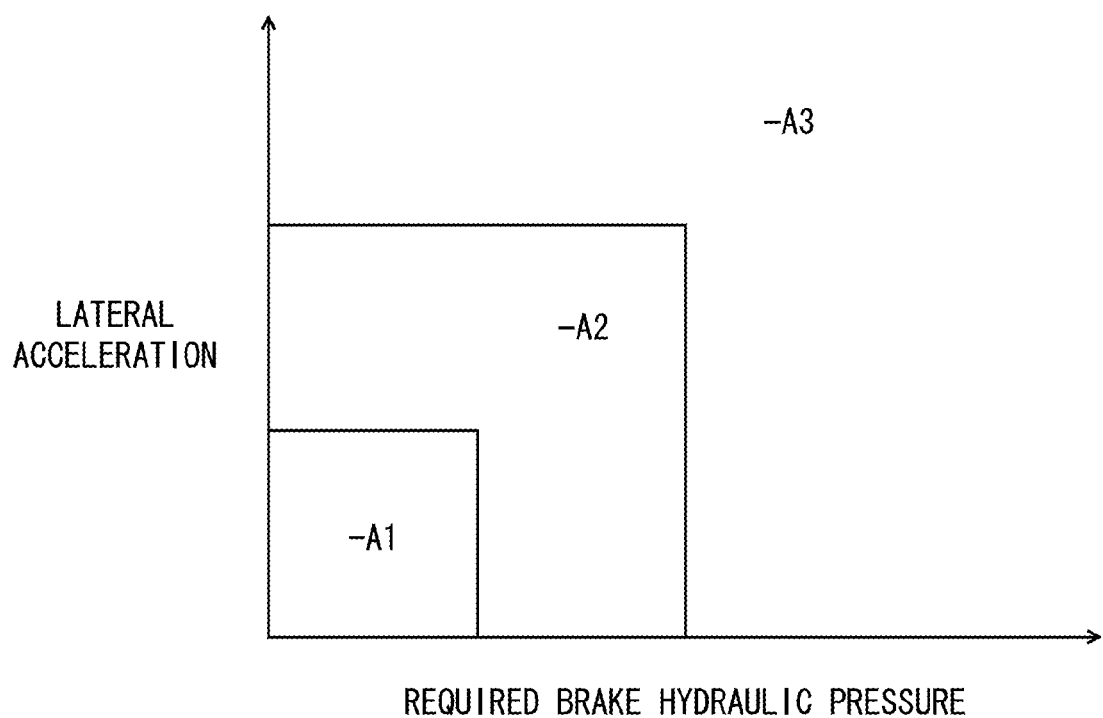
FIG. 5 is a map to calculate a temporary vehicle body deceleration.

As this occurs, the controller 100 calculates a temporary vehicle body deceleration −At based on the map shown in FIG. 5 and calculates a wheel deceleration −Ah as an inclination of a road surface based on the wheel speeds Vw at two points in time immediately before the time t2. Then, the controller 100 offsets the temporary vehicle body deceleration −At to a deceleration side by the wheel deceleration −Ah, to thereby calculate a vehicle body deceleration −Ac as shown in FIG. 6B. Here, −Ag shown in FIG. 6B denotes an actual deceleration of the vehicle, and the vehicle body deceleration −Ac calculated by the controller 100 substantially coincides with the actual deceleration −Ag of the vehicle.

Then, the controller 100 determines as to whether or not a difference between the calculated vehicle body deceleration −Ac and the wheel decelerations −Aw is equal to or less than a predetermined threshold. If it is determined that the difference is equal to or less than the predetermined threshold (at time t3), the controller 100 terminates the regenerative braking as shown in FIGS. 6C and 6E and executes the normal hydraulic pressure control.

The exemplary embodiments described above provide the following advantages.

The vehicle body deceleration calculator 150 calculates the vehicle body deceleration based on the required deceleration, which corresponds to the driver's brake operation, that is, the vehicle body deceleration calculator 150 calculates the vehicle body deceleration independently from the output of the longitudinal acceleration sensor 94. Therefore, the controller 100 can well switch control from the regenerative cooperation control to the hydraulic pressure control independently from the output of the longitudinal acceleration sensor 94.

The vehicle body deceleration calculator 150 calculates the vehicle body deceleration in consideration of the lateral acceleration (the braking force depending upon the orientation of the wheels while the vehicle is turning) and the inclination of the road surface. Therefore, the vehicle body deceleration can be calculated with good accuracy.

The inclination acquiring section 140 estimates the inclination of the road surface based on the wheel decelerations immediately before the vehicle starts braking. Thereby, the inclination of the road surface can be well estimated independently from the output of the longitudinal acceleration sensor.

The brake operation amount is obtained directly by the braking pedal stroke sensor 96. Therefore, as compared with, for example, a configuration in which the brake hydraulic pressure is obtained as an indirect brake operation amount, the required deceleration and hence the vehicle body deceleration can be calculated with good accuracy.

It should be noted that the invention is not limited to the above described exemplary embodiments. The invention may be carried out in various forms as described below.

In the exemplary embodiments described above, when the difference between the vehicle body deceleration and the wheel decelerations is equal to or larger than the predetermined value, control is switched from the regenerative cooperation control to the hydraulic pressure control. The invention is not limited thereto. For example, control may be switched from the regenerative cooperation control to the hydraulic pressure control when a difference between a vehicle body velocity, which is calculated based on the vehicle body deceleration, and the wheel speeds is equal to or larger than a predetermined value.

What is claimed is:

1. A vehicle brake hydraulic pressure control apparatus to be mounted on a four-wheel drive vehicle, the vehicle brake hydraulic pressure control apparatus for executing (i) a regenerative cooperation control in which a brake hydraulic pressure is controlled in accordance with regenerative braking and (ii) a hydraulic pressure control which is performed when regenerative braking is not in operation, the vehicle brake hydraulic pressure control apparatus comprising:
a wheel speed acquiring section configured to acquire a wheel speed from a wheel speed sensor;
a vehicle body deceleration calculator configured to calculate a vehicle body deceleration; and
a switch section configured to switch control from the regenerative cooperation control to the hydraulic pressure control, based on
(a) (i) a wheel deceleration which is determined based on the wheel speed and (ii) the vehicle body deceleration, or
(b) (i) a vehicle body speed obtained from the vehicle body deceleration and (ii) the wheel speed, wherein
the vehicle body deceleration calculator is configured to calculate the vehicle body deceleration based on a required deceleration which corresponds to a driver's operation of a braking pedal; and
a lateral acceleration acquiring section configured to acquire an acceleration of the vehicle in a lateral direction, wherein
the vehicle body deceleration calculator is configured to calculate the vehicle body deceleration based on the required deceleration and the acceleration in the lateral direction.

2. The vehicle brake hydraulic pressure control apparatus according to claim 1, further comprising:
an inclination acquiring section configured to acquire an inclination of a road surface on which the vehicle travels, wherein
the vehicle body deceleration calculator is configured to calculate the vehicle body deceleration based on the inclination of the road surface.

3. The vehicle brake hydraulic pressure control apparatus according to claim 1, further comprising:
an operation amount acquiring section configured to acquire a brake operation amount; and
an electric motor control section configured to control a brake hydraulic pressure by controlling an electric motor provided in a by-wire type electric brake system based on the brake operation amount, wherein
the required deceleration is calculated based on an output from the operation amount acquiring section.

4. The vehicle brake hydraulic pressure control apparatus according to claim 3, wherein the operation amount acquiring section is configured to acquire, from a stroke sensor that detects a stroke of the braking pedal, the stroke as the brake operation amount.

5. The vehicle brake hydraulic pressure control apparatus according to claim 1, wherein the wheel speed acquiring section outputs the acquired wheel speeds to the switch section.

6. The vehicle brake hydraulic pressure control apparatus according to claim 1, further comprising an operation amount acquiring section which acquires a stroke of the braking pedal from a braking pedal stroke sensor and outputs the acquired stroke to the vehicle body deceleration calculator.

7. The vehicle brake hydraulic pressure control apparatus according to claim 1, further comprising a lateral acceleration acquiring section which acquires an acceleration in a lateral direction of the vehicle from a lateral acceleration sensor and outputs the acquired lateral acceleration to the vehicle body deceleration calculator.

8. The vehicle brake hydraulic pressure control apparatus according to claim 1, further comprising an inclination acquiring section which acquires an inclination of a road surface on which the vehicle travels,
wherein the inclination acquiring section determines, based on a signal from a braking pedal stroke sensor, as to whether or not the vehicle has started braking, and
wherein if the inclination acquiring section determines that the vehicle starts braking, the inclination acquiring section acquires the wheel speeds at two points in time immediately before the vehicle starts braking and calculates a wheel speed deceleration (−Ah) based on the acquired wheel speeds, estimates the calculated wheel deceleration (−Ah) as an inclination of the road surface, and outputs the inclination of the road surface to the vehicle body deceleration calculator.

9. The vehicle brake hydraulic pressure control apparatus according to claim 8, wherein the vehicle body deceleration calculator calculates the vehicle body deceleration based on (i) required deceleration which is based on the driver's operation of the braking pedal and (ii) a lateral acceleration and corrects the calculated vehicle body deceleration based on the inclination of the road surface or wheel deceleration (−Ah).

10. The vehicle brake hydraulic pressure control apparatus according to claim 9, wherein the vehicle body deceleration calculator calculates a required brake hydraulic pressure based on a stroke which is output from an operation amount acquiring section, as a value corresponding to a required deceleration and the vehicle body deceleration calculator calculates a temporary vehicle body deceleration (−At) based on the required brake hydraulic pressure calculated, the lateral acceleration, and a map.

11. The vehicle brake hydraulic pressure control apparatus according to claim 10, wherein the map indicates a relationship among the required brake hydraulic pressure, the lateral acceleration, and the temporary vehicle body deceleration (−At).

12. The vehicle brake hydraulic pressure control apparatus according to claim 11, wherein the map is prepared so that an absolute value of a temporary vehicle body deceleration −At increases with an increase of the required brake hydraulic pressure and an increase of the lateral acceleration.

13. The vehicle brake hydraulic pressure control apparatus according to claim 12, wherein the vehicle body deceleration calculator obtains a temporary vehicle body deceleration (−At) by using the map, and the vehicle body deceleration calculator calculates the vehicle body deceleration (−Ac) by offsetting the calculated temporary vehicle body deceleration (−At) by the inclination of the road surface or the wheel deceleration (−Ah) using the following equation (1):

$$-Ac = -At - Ah \quad (1).$$

14. The vehicle brake hydraulic pressure control apparatus according to claim 1, wherein the vehicle body deceleration calculator obtains a temporary vehicle body deceleration −At and calculates the vehicle body deceleration (−Ac) by offsetting the temporary vehicle body deceleration −At by an inclination of the road surface (−Ah) using the following equation (1):

$$-Ac = -At - Ah \quad (1).$$

15. The vehicle brake hydraulic pressure control apparatus according to claim 14, wherein the vehicle body deceleration calculator is configured to start to calculate the vehicle body deceleration (−At) from the point in time when the driver depresses the braking pedal BP.

16. The vehicle brake hydraulic pressure control apparatus according to claim 1, wherein the switch section calculates a wheel deceleration (−Aw) based on wheel speeds output from the wheel speed acquiring section and determines as to whether or not an absolute value of a difference between the vehicle body deceleration (−Ac) and the wheel deceleration (−Aw) is equal to or larger than a predetermined threshold.

17. The vehicle brake hydraulic pressure control apparatus according to claim 16, wherein when it is determined that the absolute value of the difference between the vehicle body deceleration (−Ac) and the wheel deceleration (−Aw) is equal to or larger than the predetermined threshold, the switch section outputs a termination signal for terminating the regenerative cooperation control.

18. A vehicle brake hydraulic pressure control apparatus to be mounted on a four-wheel drive vehicle, the vehicle brake hydraulic pressure control apparatus for executing (i) a regenerative cooperation control in which a brake hydraulic pressure is controlled in accordance with regenerative braking and (ii) a hydraulic pressure control which is performed when regenerative braking is not in operation, the vehicle brake hydraulic pressure control apparatus comprising:
a wheel speed acquiring section configured to acquire a wheel speed from a wheel speed sensor;
a vehicle body deceleration calculator configured to calculate a vehicle body deceleration; and
a switch section configured to switch control from the regenerative cooperation control to the hydraulic pressure control, based on
(a) (i) a wheel deceleration which is determined based on the wheel speed and (ii) the vehicle body deceleration, or
(b) (i) a vehicle body speed obtained from the vehicle body deceleration and (ii) the wheel speed, wherein
the vehicle body deceleration calculator is configured to calculate the vehicle body deceleration based on a required deceleration which corresponds to a driver's operation of a braking pedal;
an inclination acquiring section configured to acquire an inclination of a road surface on which the vehicle travels,
wherein the vehicle body deceleration calculator is configured to calculate the vehicle body deceleration based on the inclination of the road surface, and
wherein the inclination acquiring section is configured to estimate the inclination of the road surface based on a wheel deceleration immediately before the vehicle starts braking.

* * * * *